United States Patent

[11] 3,634,119

| [72] | Inventor | Edward F. Klenke<br>Liberty Corner, N.J. |
|---|---|---|
| [21] | Appl. No. | 884,035 |
| [22] | Filed | Dec. 10, 1969 |
| [45] | Patented | Jan. 11, 1972 |
| [73] | Assignee | E. I. du Pont de Nemours and Company<br>Wilmington, Del. |

[54] NACREOUS PIGMENT COMPOSITIONS
8 Claims, No Drawings

[52] U.S. Cl. .................................................... 106/291, 106/308 B

[51] Int. Cl. ........................................................ C09c 1/28, C09c 1/40

[50] Field of Search ............................................ 106/291, 308 B

[56] References Cited
UNITED STATES PATENTS

| 3,087,828 | 4/1963 | Linton ........................... | 106/291 |
| 3,372,047 | 3/1968 | Linton et al. ................. | 106/291 |

*Primary Examiner*—James E. Poer
*Attorney*—Frank R. Ortolani

ABSTRACT: Nacreous pigment exhibiting interference colors and a high degree of opacity, composed of a metal oxide, such as titanium dioxide, in particulate form on mica substrate, at least part of the mica substrate being calcined; and a process of preparing the pigment.

NACREOUS PIGMENT COMPOSITIONS

This invention relates to nacreous pigment compositions comprising a particulate metal oxide on mica substrate.

Nacreous pigment is known and presently widely used. Such nacreous pigment is described in U.S. Pat. No. 3,087,828 to Linton, and is composed of a translucent layer of titanium dioxide or zirconium dioxide particles deposited on micaceous flake.

The color and other optical properties of nacreous pigment varies with the depth of the metal metal oxide layer. When this oxide layer is of the order of 20 to 100 millimicrons in depth, the pigment exhibits a silver However, as the thickness of the layer of metal oxide is increased up a maximum of about 250 millimicrons, the pigment exhibits various colors of the spectrum recurring in cyclical succession, the cycles being referred to as first, second or third order colors, due to the optical phenomenon known as interference. Interference is the result of the reflectance of light from the top and bottom surfaces of a film resulting either in a reduction in the intensity of certain wavelengths of the incident light, which is known as "destructive interference," or reinforcement of the intensity of the incident light, which is known as "constructive interference." When the thickness of the film is such that a ray reflected from the top surface (the surface closest to the light source) of a film is out of phase with a ray that has passed through the film and has been reflected from the bottom surface (the surface furtherest from the light source), there is destructive interference. Further discussion of the optical principles which explain interference colors may be found in such textbooks as *Principles of Optics*, by Born and Wolf, 2nd Ed. 1964, Chapter 7, (MacMillan Co.).

The requirement that the thickness of the metal oxide layer be less than about 250 millimicrons has limited the degree of opacity obtainable using known nacreous pigment.

SUMMARY OF THE PRESENT INVENTION

The nacreous pigment of this invention, which provides increased opacity with a predetermined color, comprises a thin, adherent translucent layer of particulate metal oxide selected from the group consisting of titanium dioxide, hydrous titanium dioxide, zirconium dioxide and hydrous zirconium dioxide on mica substrate wherein at least a portion of the mica substrate in the pigment has been calcined as stated hereinafter. Substantially all of the metal oxide particles in the translucent layer less than about 0.1 micron in particle size. The thickness of the translucent layer is from about 20 to about 250 millimicrons. Calcination of at least a portion of the mica substrate is conducted prior to depositing the metal oxide particles and is carried out at a temperature ranging from about 500° C. to 1,000° C. for a period of from about 5 minutes to 2 hours.

Satisfactory mica substrate for use with this invention are mica flakes ranging in particle size from that passing through 140 mesh screen (U.S. Standard Sieve Series) down to a lower limit of about 5 microns. Preferably the mica flakes all pass through a 200 mesh screen and about 90 percent pass through 325 mesh screen (U.S. Standard Sieve Series). The mica may be any commercially available "white" muscovite mica. A preferred mica is one which has been water-ground prior to the calcination required by this invention. In addition biotite, phlogotite, related vermiculite, and various synthetic micas, especially those which resemble white mica, may be used in present invention.

The nacreous pigment of this invention exhibits increased opacity at predetermined color without sacrificing other pigment properties. For example, pigment comprising titanium dioxide deposited on one mica substrate was found to have the following properties, based upon the weight of titanium dioxide in the pigment:

| Approximate weight % of titanium dioxide | Color of Reflected Light | |
|---|---|---|
| | (Uncalcined mica Substrate) | (Calcined mica Substrate) |
| 1. | 75 | — | Dull blue grey |
| 2. | 50 | Copper red | Gold |
| 3. | 31 | Gold | Pearl |
| 4. | 21 | Pearl | Very light: Insufficient TiO₂ to develop intense pearl. |

As these data show, a greater amount of metal oxide is deposited upon calcined mica substrate than on uncalcined mica substrate to obtain reflected light of the same color. Increased opacity results when using the calcined mica as in this invention to produce pigment of a particular color than when uncalcined mica is used, due to the higher ratio of metal oxide to mica in the pigment. The deposition of metal oxide on mica substrate is accomplished by using any conventional technique. U.S. Pat. No. 3,087,828 illustrates suitable deposition techniques for use with this invention, and the details of that patent are hereby incorporated herein by reference.

Improvement in the opacity of a nacreous pigment of a specified color will occur by using as the substrate at least a portion of calcined mica flakes; however, it is likely in commercial operation with this discovery that from about 10 up to 100 percent by weight of the mica substrate will be calcined mica substrate.

The following examples are intended to illustrate the invention and not to be in limitation thereof. All parts and percentages referred to herein are by weight unless otherwise indicated.

EXAMPLE 1

A water-ground muscovite mica in flake form all of which passes through a 200 mesh and 90 percent of which passes through 325 mesh (U.S. Standard Sieve Series), commercially available under the name "Alsibronz," from Franklin Mineral Products Co., Wilmington, Massachusetts, is divided into portions of about 5 grams each and weighed accurately to the milligram. The portions are placed in silica boats, and heated in a muffle furnace for the times and temperatures shown in table I. The resulting calcined mica is removed from the furnace, cooled and accurately reweighed. The weight loss is due to loss of water and other volatile materials.

The calcined mica samples prepared as just stated are used as substrate for the preparation of flake pigment coated with titanium dioxide using procedures described in the U.S. Pat. to Linton, No. 3,087,828. The amount of titanyl sulfate hydrolyzed is varied for each sample as necessary to produce the same light gold interference color in the resulting product. This is accomplished by allowing the hydrolysis process to proceed in each case until an "in process" test is performed by placing a drop of hydrolysis slurry, which has been subjected to reflux at the boil for a period of time, on a black background, diluting the drop with an equivalent volume of water, and observing the color of the drop. When hydrolysis has proceeded to where the desired color is produced, the mica substrate with the titanium dioxide deposited thereon is filtered, washed, and then calcined in air at 950° C. for 1 hour as described in example 3 of the cited Linton patent.

As a control, a portion of the same "Alsibronz" mica is used, without precalcination, in the same manner as just stated to produce nacreous pigment. The pigment produced is analyzed for percent TiO₂ which has been deposited on the mica, based on total weight of the pigment. The pigment is also tested for opacity by obtaining reflectance readings on standard acrylic drawdowns over black test paper using a Glossimeter Colorimeter Model J-5 sold by Lockwood and McLorie, Hatboro, Pa. The data obtained are shown in table 1.

TABLE I

| Time and temp. of mica calcination | | Percent wt. loss on calcination | Percent wt. TiO₂ in coated pigment | Opacity (reflectance readings in arbitrary units) |
|---|---|---|---|---|
| ° C. | Minutes | | | |
| 550: | | | | |
| (a) | 5 | 0.356 | | |
| (b) | 100 | 0.532 | | |
| 650: | | | | |
| (c) | 5 | 0.438 | 30.1 | 6.5 |

TABLE I

| Time and temp. of mica calcination °C. | Minutes | Percent wt. loss on calcination | Percent wt. TiO₂ in coated pigment | Opacity (reflectance readings in arbitrary units) |
| --- | --- | --- | --- | --- |
| (d) | 10 | 0.564 | 48.1 | 8.0 |
| (e) | 30 | 1.085 | 49.9 | 7.8 |
| (f) | 70 | 1.213 | 50.9 | 8.5 |
| (g) | 85 | 1.359 | 50.8 | 8.6 |
| (h) | 100 | 1.371 | 51.4 | 8.5 |
| 750: | | | | |
| (i) | 5 | 1.125 | | |
| (j) | 10 | 2.004 | | |
| (k) | 30 | 3.19 | 49.9 | 8.3 |
| (l) | 40 | 3.22 | 48.7 | 8.1 |
| (m) | 60 | 3.136 | 45.5 | 7.9 |
| 850: | | | | |
| (n) | 5 | 2.328 | 50.9 | 8.3 |
| (o) | 10 | 3.333 | 44.5 | 7.6 |
| (p) | 30 | 4.386 | 34.9 | 6.9 |
| (q) | 40 | 4.425 | | |
| (r) | 60 | 4.371 | | |
| 950: | | | | |
| (s) | 5 | 3.69 | 38.9 | 6.7 |
| (t) | 10 | 4.36 | 35.3 | 6.5 |
| (u) | 30 | 4.29 | 32.0 | 6.3 |
| (v) | 40 | 4.05 | | |
| (w) | 60 | 4.24 | | |
| (x) | (¹) | | 22.0 | 5.1 |

¹ Uncalcined mica.

These data confirm the direct relationship between the amounts of titanium dioxide deposited on the mica substrate and the opacity of the pigment. Study of these and similar data have led to the conclusion that too long a time or too high a temperature for calcination begin to limit the improvement in opacity Satisfactory conditions for the calcination of the mica are: 650° C. for from about 10 to 100 minutes; 750° C. for from about 30 to 60 minutes: 850° C. for up to about 5 minutes.

EXAMPLE 2

Mica calcined in the same manner as portion *u* in example 1 is blended with uncalcined mica in weight proportions of 26 percent calcined mica and 74 percent uncalcined mica. The blended mixture is subjected to the hydrolysis procedure to deposit TiO₂ as described in example 1 and using the "in process" test to obtain a pale gold color. A sample using 100 percent uncalcined mica is processed in the same manner for reference purposes. The following data are obtained:

TABLE II

| | Blend of Calcined and Uncalcined Mica Substrate | Uncalcined Mica Substrate |
| --- | --- | --- |
| Wt. % TiO₂ on pigment | 35% | 27% |
| Opacity (Arbitrary Units) | 5.4 | 4.8 |

EXAMPLE 3

Two separate lots of pigment are made using as the substrate (A) mica calcined in the same manner as portion *u* of example 1, and (F) uncalcined mica. The coating procedure with TiO₂ and the final pigment calcination of each of the separate lots is carried out in the manner as is indicated in example 1 using the "in process" test to obtain the same pale gold color of example 2. The two separate lots are blended in the proportions given in table III. Reflectances are measured to determined the opacity of all blends as well as the lot (A) of 100 percent calcined mica and the lot (F) of 100 percent uncalcined mica.

TABLE III

Pigment Compositions

| Sample | Calcined mica (% Wt.) | Uncalcined mica (% Wt.) | Opacity (Arbitrary Units) |
| --- | --- | --- | --- |
| A | 100 | 0 | 7.5 |
| B | 90 | 10 | 6.8 |
| C | 75 | 25 | 6.4 |
| D | 50 | 50 | 5.9 |
| E | 25 | 75 | 5.4 |
| F | 0 | 100 | 4.8 |

The results indicate that the invention is useful in producing pigment wherein separate pigments are produced using calcined and uncalcined substrates and the resulting pigments then are blended.

EXAMPLE 4

Mica substrate calcined at the same conditions of time and temperature as portion *u* of example 1 is subjected to deposition of TiO₂ by a hydrolysis procedure as indicated in conjunction with example 1, allowing the hydrolysis to continue until a very deep color is obtained. The amount of TiO₂ deposited is found to be 76.6 percent by weight of the finished pigment. A high opacity pigment is thereby obtained, having a first-order blue interference color.

Procedures followed in the foregoing examples show that blending of calcined with uncalcined mica substrate can take place at several points in the pigment preparation to achieve the desirable results. Calcined and uncalcined mica can be blended and the blend subjected to hydrolysis to deposit the hydrous metal oxide in particulate form on the mica substrate. Calcined and uncalcined mica can be subjected to the hydrolysis step separately, the hydrolysis slurries blended, filtered, washed and subjected to a second calcination together. Calcined and uncalcined mica can be finished separately through the second calcination step and the finished pigments blended in the desired proportions. And calcined and uncalcined mica can be blended at any step such as filtering, washing, drying or at the second calcination step of the separate pigment lots.

The description of the invention which has been given shows that a nacreous pigment prepared with mica substrate calcined prior to metal oxide deposition is superior in opacity at equal color when compared with pigments of the prior art. Other aspects of practice of this invention, such as oxide layer deposition, calcination of mica containing the oxide layer, limiting particle size in the layer by avoiding undue growth, preparation of substrate, and the like, all now are techniques well known in the commercial and patent art. As noted above, for such detail attention is invited to cited Linton patent, though other useful techniques will occur to those skilled in the art.

I claim:

1. A nacreous pigment consisting essentially of mica substrate in flake form having deposited thereon particulate metal oxide as a translucent layer of from about 20 to 250 millimicrons in thickness, the metal oxide being selected from the group consisting of hydrous titanium dioxide, titanium dioxide, hydrous zirconium dioxide, and zirconium dioxide, wherein substantially all of the metal oxide particles are less than 0.1 micron in particle size, at least a portion of the mica substrate having been calcined at a temperature of from about 550° C. to about 1,000° C. for a period of from about 5 minutes to 2 hours prior to deposition of the metal oxide layer thereon.

2. A nacreous pigment of claim 1 wherein the metal oxide is titanium dioxide and is in an amount from about 30 to about 75 percent by weight of the pigment.

3. A nacreous pigment of claim 1 wherein the portion of mica substrate that has been subjected to calcination is from about 10 to 100 percent by weight of the mica substrate.

4. A process of making a nacreous pigment having a particulate metal oxide layer on mica substrate, comprising a. calcining mica substrate at a temperature of from about 550° C. to about 1,000° C. for a period of from about 5 minutes to 2 hours; and b. depositing on the resulting calcined mica substrate particles of metal oxide as a translucent layer of from about 20 to 250 millimicrons in thickness, said metal oxide being selected from the group consisting of hydrous titanium dioxide, titanium dioxide, hydrous zirconium dioxide and zirconium dioxide, and said metal oxide particles are less than 0.1 micron in particle size.

5. A process of claim 4 wherein the mica substrate is in flake form all of which passes 140 mesh screen and has a size, in major dimension, of at least 5 micron.

6. A process of claim 4 wherein uncalcined mica substrate is blended with the calcined mica substrate and said metal oxide is deposited as a layer on the mica in said blend.

7. A process of claim 6 wherein at least 10 percent of the mica substrate blend is calcined mica.

8. A process of claim 4 wherein calcined mica substrate having the metal oxide layer deposited thereon is blended with uncalcined mica substrate having a metal oxide layer deposited thereon.

* * * * *